United States Patent [19]
Gyory

[11] 3,937,477
[45] Feb. 10, 1976

[54] MECHANICAL SEAL SYSTEM

[75] Inventor: Emeric J. Gyory, Park Ridge, Ill.

[73] Assignee: Borg-Warner Corporation, Chicago, Ill.

[22] Filed: Dec. 26, 1973

[21] Appl. No.: 428,164

[52] U.S. Cl. ............... 277/25; 277/65; 277/134; 277/67
[51] Int. Cl.² ......................................... F16J 15/16
[58] Field of Search ............ 277/25, 65, 134, 3, 27, 277/67; 308/36.4

[56] References Cited
UNITED STATES PATENTS

| | | | |
|---|---|---|---|
| 1,539,941 | 6/1925 | Gentry | 277/25 X |
| 2,556,393 | 6/1951 | Holben | 277/134 |
| 2,844,418 | 7/1958 | Audemar | 277/134 X |
| 3,068,801 | 12/1962 | Murray | 277/3 X |
| 3,236,529 | 2/1966 | Heim | 277/67 X |
| 3,246,901 | 4/1966 | Wickli | 277/3 |
| 3,395,645 | 8/1968 | Vilet | 277/65 X |
| 3,468,548 | 9/1969 | Webb | 277/13 |
| 3,472,169 | 10/1969 | Dyke et al. | 277/25 X |
| 3,746,350 | 7/1973 | Mayer | 277/134 X |

FOREIGN PATENTS OR APPLICATIONS

| | | | |
|---|---|---|---|
| 1,264,949 | 2/1972 | United Kingdom | 277/25 |
| 1,270,762 | 4/1972 | United Kingdom | 277/134 |

*Primary Examiner*—Samuel B. Rothberg
*Attorney, Agent, or Firm*—James A. Geppert

[57] ABSTRACT

A sealing system for a rotatable shaft positioned in a passage extending through a housing where both static and dynamic sealing are achieved to prevent fluid leakage along the shaft from the liquid side to the air side of the seal. The system includes a helix formed either on the shaft or on the wall encompassing the shaft to provide a viscous shear pump forming a hydrodynamic seal, and a temporary face seal is provided at the air side end of the helix and adapted to effectuate sealing under static conditions and to diminish face seal contact upon rotation of the shaft.

11 Claims, 6 Drawing Figures

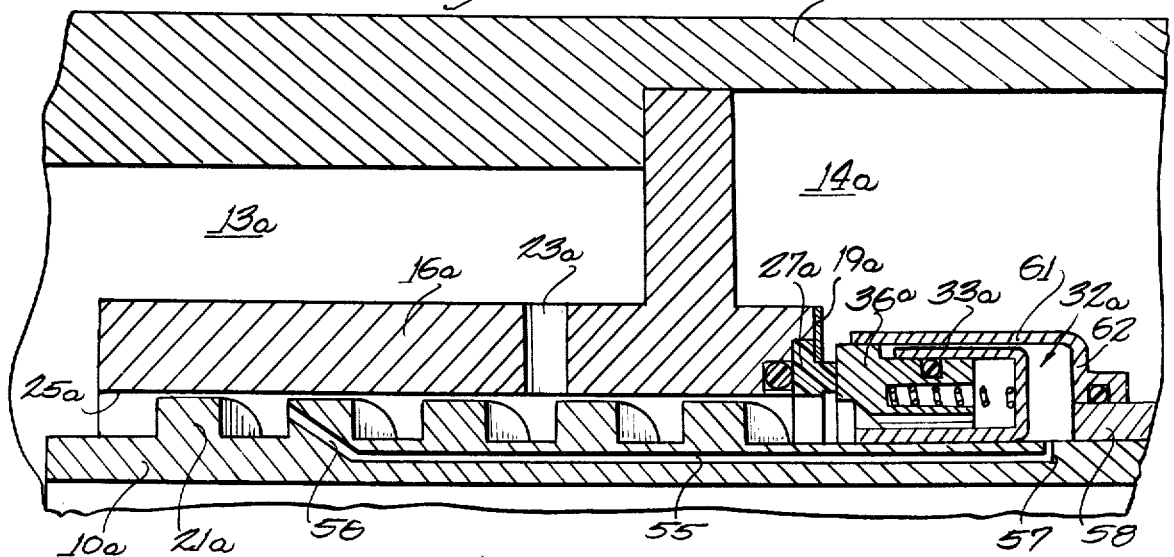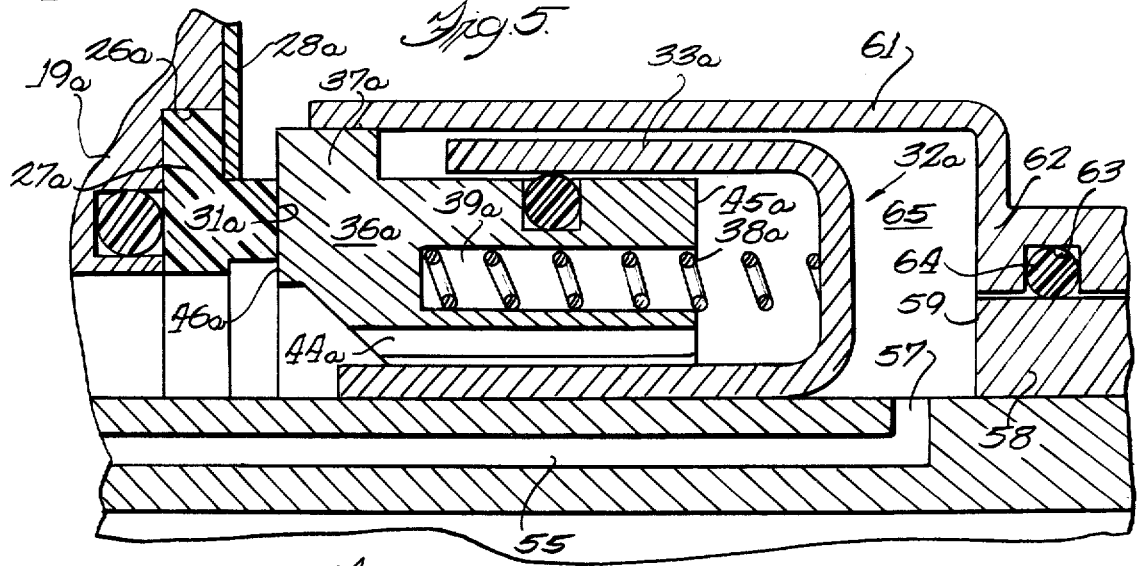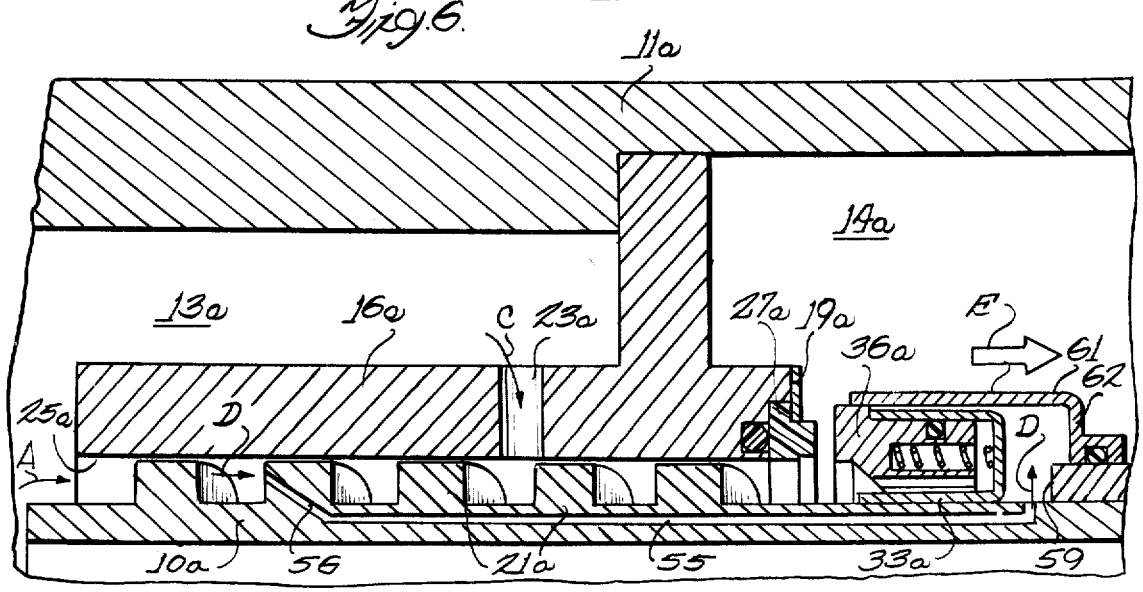

3,937,477

MECHANICAL SEAL SYSTEM

BACKGROUND AND SUMMARY OF THE INVENTION

The present invention relates to a mechanical seal system to prevent fluid leakage along a shaft extending through a housing, and more particularly to a sealing system for a shaft in a housing providing a temporary face seal under static conditions and a non-contacting dynamic seal operative upon rotation of the shaft.

Numerous prior seal constructions have been developed attempting to provide an effective sealing means for the prevention of fluid leakage between a rotating shaft and the housing therefor. Such sealing devices fall into the catagories of continuous contact seals, labyrinth-type seals and hydrodynamic seals. Of concern in the present invention is the sealing of low to medium pressure liquid around high speed shafts where the shaft is rotating at a speed of over 5000 revolutions per minute. The opposing requirements of such a system are minimum or no leakage and minimum torque or wear versus maximum life. These requirements can be ideally reconciled by the present seal system.

Among the objects of the present invention is the provision of a mechanical seal system having a non-contracting hydrodynamic seal to initiate and sustain fluid flow in a direction opposite to the direction of leakage along a shaft in a housing during rotation thereof. The hydrodynamic seal is in the form of a helix or screw element which is formed either on the rotating shaft or on the cylindrical wall surrounding the shaft and provides the solution to the requirement of minimum or no leakage, no wear, and long life. These functions, however are provided only under dynamic conditions where the helix performs as a viscous shear pump above the minimum shaft speed necessary for this type of seal. In the absence of these operational conditions, leakage would occur through the helix pump clearance.

Another object of the present invention is the provision of a mechanical seal system utilizing a temporary contact or face seal to prevent leakage along the shaft under generally static conditions when the hydrodynamic seal becomes partially or fully inoperative. This temporary seal includes a stationary face ring mounted in the housing and a rotating face seal flexibly attached to and rotating with the rotatable shaft. The rotary face seal is spring-loaded and hydrostatically balanced so as to be urged toward the stationary face ring and provide sealing contact therewith. The seal is also equipped with an unloading device activated as a result of rotation of the shaft to retract the rotary face seal as the helix-induced flow approaches and then effects fluid sealing.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 4 is a partial vertical cross sectional view of an alternate embodiment of seal system.

FIG. 5 is an enlarged cross sectional view of the temporary face seal structure of FIG. 4.

FIG. 6 is a cross sectional view similar to FIG. 4, but with the face seal retracted upon shaft rotation.

DESCRIPTION OF THE PREFERRED EMBODIMENTS

Figure 1:
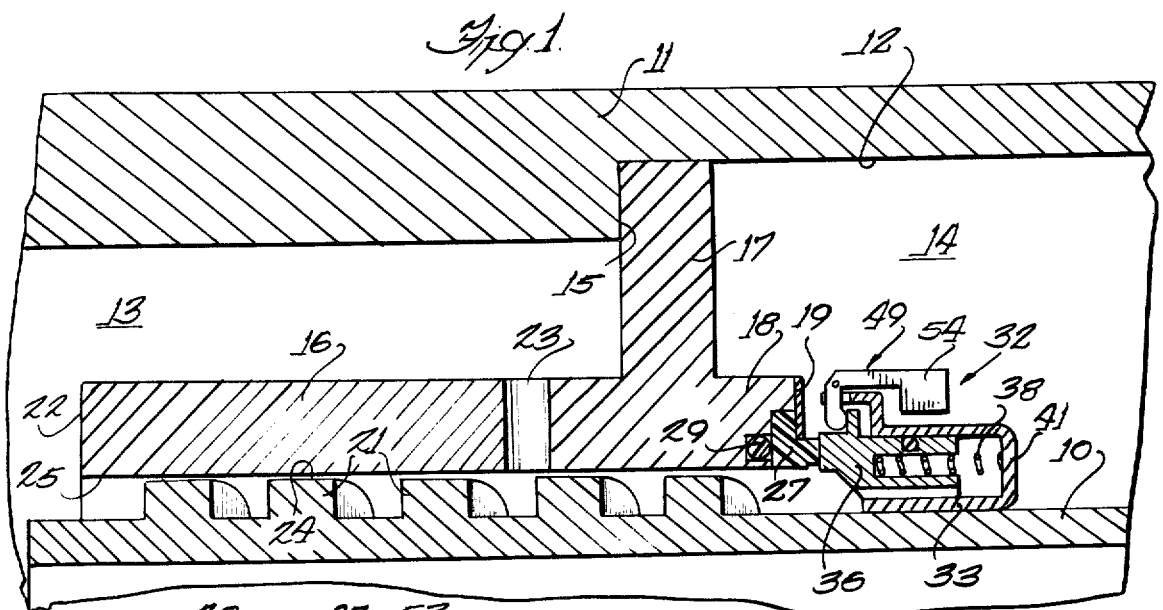
FIG. 1 is a partial vertical cross sectional view of a first embodiment of mechanical seal system with the temporary face seal in operative sealing position.
Figure 2:
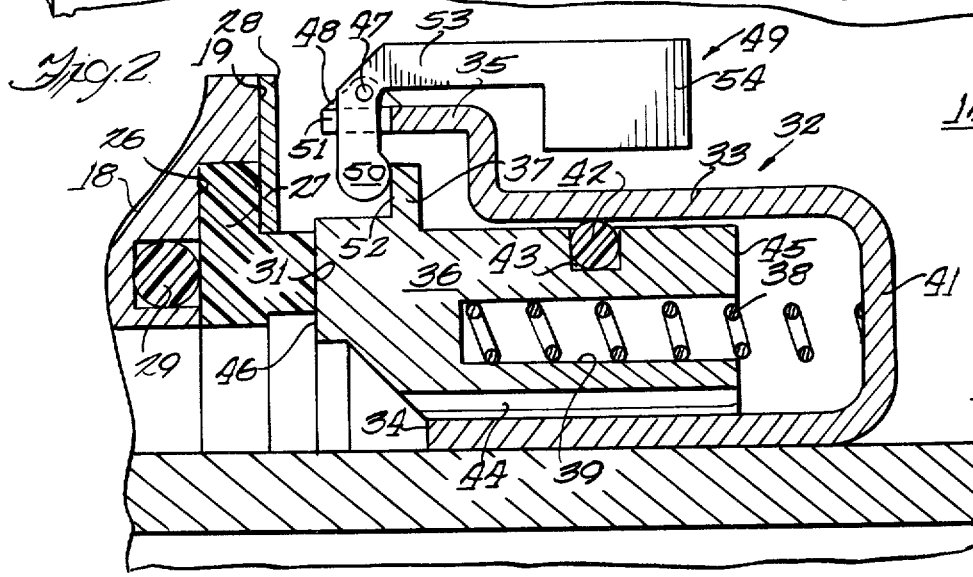
FIG. 2 is an enlarged cross sectional view of the temporary face seal portion of FIG. 1.
Figure 3:
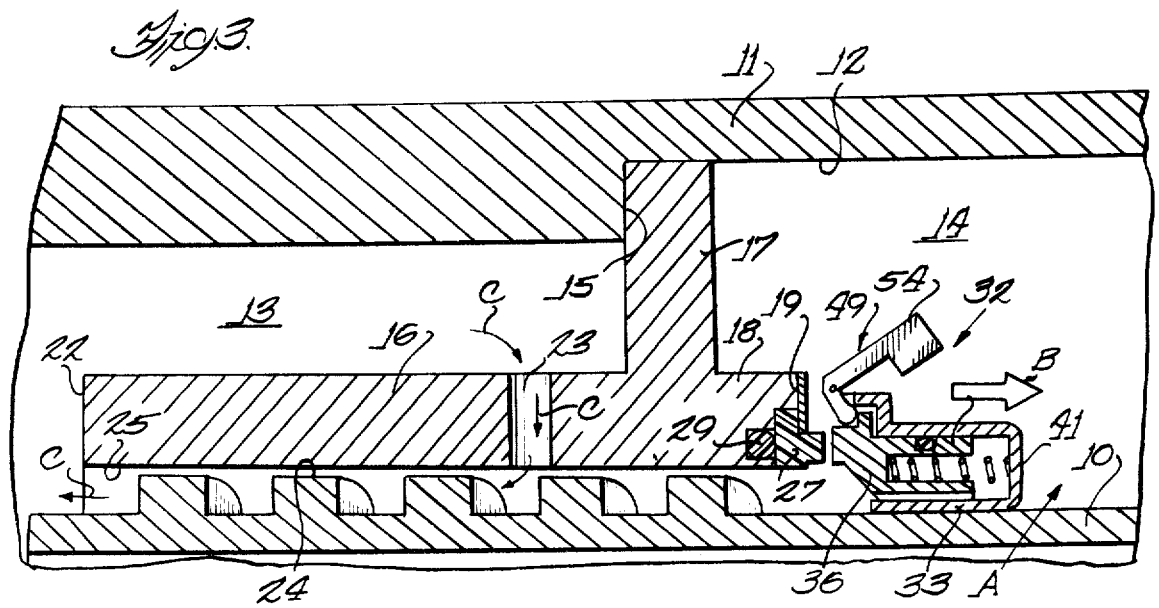
FIG. 3 is a partial vertical cross sectional view of the embodiment of FIG. 1 with the shaft rotating and showing the face seal retracted.

Referring more particularly to the disclosure in the drawings wherein are shown illustrative embodiments of the present invention, FIGS. 1 to 3 disclose one embodiment of a mechanical seal system for a shaft 10 mounted for rotation in the cylindrical bore 12 of a housing 11, where leakage between the liquid side 13 and the air side 14 is to be prevented by the use of a fluid sealing system. The housing 11 includes a shoulder 15 in the stepped cylindrical bore 12, and a cylindrical sleeve 16 is positioned within the bore 12 and has a radial flange 17 that abuts the shoulder 15. The flange 17 is suitably secured, as by a liquid-tight friction fit, within the bore 12 and provides a dividing wall between the liquid side 13 and the air side 14.

The flange 17 is so positioned that the majority of the sleeve 16 extends into the liquid side 13 with only a short sleeve portion 18 extending into the air side 14. The shaft 10 is provided with an integral helix 21 on the exterior surface thereof which has a thread configuration to pump liquid toward the liquid side 13 upon rotation of the shaft in the direction of the arrow A (FIG. 3). This helix stops short of the end 19 of the short sleeve portion 18 and extends substantially to or beyond the opposite end 22 of the sleeve. The sleeve is provided with a plurality of circumferentially spaced radial openings 23 located adjacent the flange 17 on the liquid side 13.

The helix 21 on the shaft 10 provides a non-contacting hydrodynamic seal utilizing the principle of a viscous shear pump with the liquid on the liquid side 13, which liquid may be oil. A narrow clearance is provided between the outer periphery 24 of the helix and the cylindrical interior surface 25 of the sleeve 16 to provide minimum leakage, no wear and long life of the seal under dynamic conditions.

The sleeve end 19 is provided with a recess 26 to receive a stationary seal ring 27 formed of a suitable material, such as carbon graphite, which is retained in position by a retaining ring 28 suitably secured to the sleeve end 19. Behind the seal ring 27 in an extension of the recess 21 is an O-ring 29 acting to aid in the sealing characteristics of the ring 27. The ring 27 is provided with a flat annular sealing face 31 to be engaged by a rotary seal ring 32.

The rotary sealing ring 32, as more clearly seen in FIG. 2, includes an annular housing 33 of a generally U-shape in cross section with an open end 34 facing the sealing face 31. The housing has a generally cylindrical enlargement 35 on the exterior surface of the housing at the open end 34, and an annular reciprocable sealing ring body 36 having a circumferential flange 37 thereon is received in the housing 33 with the flange 37 located in the enlargement 35. A plurality of relatively light compression springs 38 are positioned in rearwardly opening recesses 39 in the ring 36 and extend to abut the rear wall 41 of the housing 33, and an O-ring 42 is positioned in a circumferential groove 43 in the outer periphery of the ring body 36 to seal the ring body in the housing.

The inner periphery of the ring body is formed with a plurality of circumferentially spaced longitudinally extending channels or grooves 44 which provide communication between the space defined by the shaft 10 and the sleeve 16 communicating with the liquid side 13 and the rear end 45 of the ring body 36 within the housing 33; some of the grooves receiving antirotational ribs (not shown) formed to extend inwardly from the housing 33. As the springs 38 are necessarily relatively weak, the liquid pressure of the liquid area 13 is also present in the housing 33 and acts on the rear end 45 of the ring body 36 to provide a hydrostatic force to urge the ring body against the face 31 of the stationary ring seal 27.

The ring body 36 is provided with a flat sealing face 46 formed of a hard-faced metal, such as tungsten carbide, adapted to be yieldably biased against the flat seal face 31 to provide a temporary static seal and prevent leakage of fluid from the liquid side 13 to the air side 14. Pivotally mounted on pins 47 received in pairs of ears 48 formed on the enlargement 35 are a plurality of circumferentially spaced bell cranks 49, each having a radially inwardly extending arm 50 received in a notch 51 betweeen the ears 48 and adapted to engage the front surface 52 of the rib 37, and a generally horizontally oriented arm 53 that is considerably longer than the arm 50 and terminates in an enlarged end 54.

When the system is in the static state, the relatively light springs 38 tend to urge the reciprocable seal ring body 36 to the left, as seen in FIG. 1, so that the hard sealing face 46 engages the flat sealing face 31 of the stationary ring 27. Also, the pressure of the liquid from the liquid side 13 of the seal is communicated along the shaft 10 and through the channels 44 to the interior of the housing 33. As the hydrostatically unbalanced area of the rear end 45 of the ring body 36 is approximately the same as the area of the contacting sealing faces 31 and 46, a hydrostatic force is created to urge the sealing ring body 36 against the stationary sealing ring 27 and provide a static seal preventing leakage of the liquid to the air side 14.

When rotation of the shaft 10 is initiated in the direction of arrow A, the rotary seal ring 32 has sliding contact with the stationary seal ring 27 to retain the sealing contact. As the speed of rotation increases, the viscous shear pump action of the helix 21 begins to move liquid along the shaft toward the liquid side 13. Also, centrifugal acceleration created by rotation of the housing 33 begins to act on the mass of the enlarged ends 54 of the bell cranks 49 to urge the enlarged ends radially outward relative to the housing 33.

When the shaft speed reaches approximately 5000 revolutions per minute, the helix-induced flow of liquid provides complete fluid sealing along the shaft 10, and the rotating face contact pressure is reduced to zero due to the centrifugal force acting on the enlarged ends 54 to move the ends outward, as more clearly shown in FIG. 3. This movement causes rotation of the bell cranks 49 about the pivot pins 47 so that the arms 51 act on the rib 37 to retract the seal ring body 36 against the force of the springs 38 and retract the sealing face 46 off of the seal ring 27 in the direction of the arrow B (FIG. 3).

Furthermore, the action of the helix 21 draws liquid from the housing 33 behind the seal ring body 36 through the channels 44 to change the hydrostatic balance therein. The flow of liquid in the direction of the arrows C also causes fluid from the exterior of the sleeve 16 to be drawn through the radial openings 23 into the helix pump and creates a relatively continuous flow of fluid therein during rotation of the shaft. When the shaft rotation decreases, the hydrodynamic sealing action decreases but the face seal again has the faces 31, 46 engaging to provide the sealing function as the system approaches a static condition.

FIGS. 4 through 6 disclose an alternate embodiment of the mechanical seal system wherein like parts have the same reference number followed by an *a*. The system includes a rotatable shaft 10*a* in a housing 11*a* where the hydrodynamic sealing portion is identical to that shown in FIGS. 1 through 3, including the sleeve 16*a* in the housing having a stationary seal ring 27*a* at the air side 14*a* and a plurality of radial openings 23*a* communicating with the liquid side 13*a*. The shaft 10*a* has a helix 21*a* in non-contracting position with respect to the interior cylindrical surface 25*a* of the sleeve 16*a*. The shaft 10*a* is altered to provide one or more passages 55 in the shaft body extending between angled outlets 56 in or adjacent the forward edge of one turn of the helix to the left of the radial openings 23*a*, as seen in FIG. 4, and radially extending outlets 57 spaced to the right of the rear end of the helix 21*a*.

The stationary seal ring 27*a* is positioned in a recess 26*a* in the end 19*a* of the sleeve 16*a* and retained therein by a suitable retaining ring 28*a*. Facing the flat sealing face 31*a* is a reciprocable ring body 36*a* mounted for reciprocable movement relative to the shaft 10*a* in a housing 33*a* to provide the rotary seal ring 32*a*; the ring body 36*a* having a radial flange 37*a*. In this embodiment, the housing 33*a* is press-fitted onto the shaft 10*a* to rotate therewith. The seal body has recesses 39*a* for compression springs 38*a* and the channels 44*a* on the inner periphery thereof to allow liquid pressure communication from the liquid side 13*a* to the area behind the seal body 36*a*.

The shaft 10*a* includes a press-fitted sleeve 58 forming a shoulder 59 spaced rearwardly of the radial outlets 57. Encompassing the housing 33*a* and the seal ring body 36*a* is a stepped generally cylindrical member 61 having a radially inwardly extending flange 62 slidably mounted over the sleeve 58 and having an annular groove 63 receiving an O-ring 64; the ring body 36*a* being press-fitted into the member 61.

Under static conditions, the combination of the hydrostatic pressure of the fluid passing through the channels 44*a* acting on the hydrostatically unbalanced area of the rear end 45*a* of the receiprocable ring body 36*a*, and the force of the springs 38*a* provides a hermetic closure between the seal faces 31*a* and 46*a*. When the shaft begins to rotate in the direction of the arrow A (FIG. 6), the helix 21*a* performs the function of a viscous shear pump to move the liquid between the shaft and sleeve toward the liquid side 13*a*, and the liquid is drawn through the openings 23*a* in the direction of arrows C.

As the shaft speed approaches 5000 rpm., the movement of fluid through the openings 23*a* causes an increase in pressure in the helix area and in the angled outlets 56, the passages 55 and the radial outlets 57 to cause fluid to enter the space 65 as indicated by arrows D. The increase in pressure in the space 65 between the housing 33a and the member 61 causes movement of the member 61 and the ring body 36a to the right in the direction of the arrow E as seen in FIG. 6. The movement of liquid by the helix also reduces the hydrostatic pressure, and the sealing force on the ring body 36a within the housing 33a to enhance the motion of the ring body against the force of the springs. Thus, when the hydrodynamic seal created by the helix become effective, the seal body 36a is retracted to part the sealing faces 31a, 46a; movement being limited by the flange 37a contacting the housing 33a. The liquid drawn through the radial openings 23a provides a continuous path of circulation so that liquid is always present in the helix and acts to build up pressure in the passages 55.

Although in the above described embodiments, the helix 21 or 21a has been shown as integrally formed on the exterior surface of the rotating shaft 10 or 10a, this invention also contemplates the formation of the helix on the interior surface of the sleeve 16 or 16a opposite a smooth cylindrical shaft, and the viscous shear pump action would be equally effective for this arrangement of parts. The liquid could be any substantially viscous material, such as oil utilized to lubricate any high speed shaft bearings, such as turbines, turbocompressors, high speed automobile engines and the like.

I claim:

1. A sealing device for use between a pair of relatively rotating members, one of said members having an opening extending therethrough and receiving said other member therein, comprising a viscous shear pump defined between said members to provide a hydrodynamic seal therebetween, said hydrodynamic seal having dissimilar fluids on opposite sides thereof, an annular cylindrical sleeve positioned within said one member and encompassing said other member and having a radial flange sealingly engaging the interior wall of the one member and separating the dissimilar fluids, said hydrodynamic seal being formed between the other member and the sleeve, said sleeve having a plurality of radial openings therein communicating with the hydrodynamic seal and terminates in an annular rearward end, a stationary annular face ring supported by said rearward sleeve end to define a boundary between said dissimilar fluids, a rotary seal ring encompassing said other member to rotate therewith and reciprocable axially relative thereto toward and away from sealing contact with said face ring, resilient means yieldably urging said rotary seal ring against said face ring, and means operative upon relative rotation of said members to urge said rotary seal ring away from said stationary face ring.

2. A sealing device as set forth in claim 1, in which said hydrodynamic seal comprises a helix formed on the surface of the other member and extending axially substantially between the ends of the sleeve, said sleeve having a cylindrical interior surface cooperating with but not contacting said helix to form the viscous shear pump.

3. A sealing device for use between a pair of relatively rotating members, one of said members having an opening extending therethrough and receiving said other member therein, comprising a viscous shear pump defined between said members to provide a hydrodynamic seal therebetween, said hydrodynamic seal having dissimilar fluids on opposite sides thereof, a stationary annular face ring mounted in said one member to define a boundary between said dissimilar fluids, a rotary seal ring encompassing said other member to rotate therewith and reciprocable axially relative thereto toward and away from sealing contact with said face ring, said rotary seal ring including an annular housing open at the end facing said stationary face ring and adapted to rotate with said other member and an annular seal ring body received within and axially reciprocable relative to said housing, resilient means acting between said housing and said seal ring body to yieldably urge said rotary seal ring against said face ring, and means operative upon relative rotation of said members to urge said rotary seal ring away from said stationary face ring.

4. A sealing device as set forth in claim 3, in which said seal ring body has a plurality of circumferentially spaced longitudinal grooves formed on the inner periphery thereof and communicating between said last-mentioned housing and said hydrodynamic seal, a contact face at the end of the ring facing the stationary face seal, and an opposite end surface within the last-mentioned housing of substantially equal area with the contact face, the fluid pressure in the hydrodynamic seal acting on the contact face and the opposite end of the seal body to provide a hydrostatic balance acting to urge the rotary seal body toward the stationary face seal.

5. A sealing device as set forth in claim 4, in which said seal ring body is in sliding contact with the annular walls of said last-mentioned housing, and an O-ring positioned in an annular groove in the outer periphery of the seal ring body in sealing contact with said last-mentioned housing.

6. A sealing device as set forth in claim 5, in which a circumferential flange is formed on the outer periphery of the seal ring body adjacent the open end of the last-mentioned housing, and said operative means includes one or more bell cranks pivotally mounted on the last-mentioned housing, each bell crank having one arm engaging the outer surface of the flange and the other arm terminating in an enlarged end.

7. A sealing device as set forth in claim 6, in which said last-mentioned housing has a circumferential outwardly extending recess at the open end receiving and providing limited movement of said flange, the enlarged ends of the bell cranks providing a substantial mass adapted to be acted upon by centrifugal force created by the rotation of said other member to rotate the bell cranks and urge said seal ring body to a non-contacting position relative to the stationary seal ring.

8. A sealing device as set forth in claim 5, in which said operative means includes one or more longitudinally extending passages formed in the shaft and extending between a first point in the hydrodynamic seal and a second point beyond the closed end of the housing, a shoulder formed on the other member and a cylindrical member slidably engaging the shoulder and receiving said rotary sealing ring therein.

9. A sealing device as set forth in claim 8, in which said last-mentioned housing is press-fitted on said other member, and said seal ring body has a circumferential flange press-fitted in said cylindrical member and cooperating with said last-mentioned housing to limit axial movement of the cylindrical member and seal ring body.

10. A sealing device as set forth in claim 9, in which said hydrodynamic seal comprises a helix formed on the surface of said other member and extending from adjacent said stationary face ring to a point spaced from said face ring.

11. A sealing device as set forth in claim 10, in which the forward outlet of each passage is on the forward wall of a turn of the helix, such that rotation of the other member pumps fluid along the helix away from said stationary face ring and increases the pressure in the passages, which in turn causes retraction of the cylindrical member and seal ring body.

* * * * *